United States Patent [19]

Strathman

[11] 4,171,504
[45] Oct. 16, 1979

[54] CONSTANT WRITING SPEED ARC SCAN CRT DISPLAY SYSTEM

[75] Inventor: Lyle R. Strathman, Cedar Rapids, Iowa

[73] Assignee: Rockwell International Corporation, El Segundo, Calif.

[21] Appl. No.: 943,016

[22] Filed: Sep. 18, 1978

[51] Int. Cl.² .............................................. H01J 29/78
[52] U.S. Cl. .................................... 315/378; 315/367
[58] Field of Search ................. 315/378, 367; 340/745

[56] References Cited

U.S. PATENT DOCUMENTS

| 3,805,109 | 4/1974 | Cowan | 315/378 |
| 3,975,662 | 8/1976 | Janosky | 315/378 |

*Primary Examiner*—Theodore M. Blum
*Attorney, Agent, or Firm*—Richard W. Anderson; Richard A. Bachand; H. Frederick Hamann

[57] ABSTRACT

An arc-scanned sector cathode ray tube display system achieves constant writing speed by developing trigonometric X and Y deflection signals with amplitude linearly decreasing and scan rate linearly increasing as arcs are drawn from periphery toward apex of the display sector. Video/deflection synchronism is achieved by development of a video clock pulse train comprised of selected pulses from a clock source by means of which displayed video bits are shifted from rho-theta formated storage on a time/position basis such that video and beam position are synchronized to within one displayed picture element throughout the sector display.

11 Claims, 9 Drawing Figures

CONSTANT WRITING SPEED ARC SCAN CRT DISPLAY SYSTEM

This invention relates generally to cathode ray tube radar display systems and more particularly to an arc scan radar display system in which the beam is caused to scan a sector, with beam deflection rates controlled, from a peripheral one of the arcs comprising the sector towards the apex of the display, such that the deflection rate for each successive scan from the peripheral arc towards the apex is linearly increased, whereby the beam writing speed is constant for all arcs in the display.

BACKGROUND OF THE INVENTION

Description of Prior Art

Radar data is transmitted and received with a horizontal scanning antenna and detected radar returns are time organized along a time/distance radial for each given angle of antenna position. Thus, the conventional term rho-theta, or radial scan, was coined to describe the data pattern of radar returns. In radar infancy, long delay phosphor cathode ray tubes or storage tubes were used to display the radar returns, and data was written on the display in antenna-synchronized radial scan format, resulting in a sector of displayed radar.

Radially scanned sector displays however suffer in pictorial quality because of lower resolution (wide scan line separation) at the periphery of the display sector than at the apex. Thus the conventional radial scan format utilized in radar displays gave way to arc scan, where data is scanned onto the cathode ray tube orthogonally to the radar returns.

Radial scan display format causes the cathode ray tube beam to repeatedly scan from the apex towards the periphery of the display and the display format is of a "spoked" nature. Arc scan format causes the beam to constantly scan successive ones of concentric arcs which define the sector of display. In conventional arc scan systems, the radar data is organized or converted from the $\rho/\theta$ received format to an arc scan format for successive readout from storage of these information bits for a given $\rho$ (distance) throughout the scanning of an arc at that distance-defined radial. As such, the arc-scan display is of an improved quality since the data is displayed orthogonally to the radar returns.

While conventional arc scanned displays eliminate the undesirable "spoked" nature of radial-scanned displays, these types of displays currently define a constant scanning time for each arc (utilize a constant horizontal scan frequency). Because of this constant horizontal scan frequency, several display deficiencies remain in conventional arc scan displays. Firstly, since the writing speed at the sector periphery is very fast and at the sector apex is very slow, deflection power remains relatively high to accommodate the fast peripheral scan. Secondly, since the writing speed at the periphery is considerably slower than writing speeds towards the apex on successive arcs in the display, brightness compensation circuits have to be maintained.

The left-over problems introduced by arc scan displays have been subsequently resolved with the introduction of X-Y scanned (TV scan) radar displays. This latter technique, however, introduces a "blocking" or "stair-step" pictorial effect because data is never displayed orthogonally to, or parallel to, radar reception data, except on the imaginary line through the center of the displayed sector. Displays of the TV scan type, while eliminating problems of uneven brightness and relatively high power encountered in arc scan displays, nonetheless provide a display which is of a synthetic or approximated nature due to the stair-step effect.

Accordingly, it is a primary object of the present invention to provide an improved arc scan display system employing a concept of constant writing speed throughout the display, wherein radar data is displayed orthogonally to radar reception data at all points on the display sector.

A further object of the present invention is to provide an improved arc scan cathode ray tube display system wherein peripheral arc scan writing speed may be appreciably reduced from that of conventional arc scan displays, resulting in an appreciably increased display brightness.

A still further object of the present invention is the provision of an arc scan display system employing constant writing speed, wherein the deflection amplifier voltage requirements may be appreciably reduced from those necessary in conventional arc scan display systems.

A still further object of the present invention is the provision of an improved arc scan display system with constant writing speed throughout the displayed sector, wherein the need for brightness compensation is eliminated.

The present invention is featured in means for generating horizontal and vertical deflection signals respectively defined as $A \sin \omega t$ and $A \cos \omega t$, where A is a predetermined different constant amplitude during each of successive arcs to be scanned and is linearly decreased from a maximum value during scanning of the peripheral one of the arcs to successively lesser values for successive arcs beneath the peripheral arc. The scan rate ($\omega t$) is increased from a minimum value during scanning of the peripheral one of said arcs to successively greater values at successive increased rates for successive arcs beneath the peripheral one of the arcs in the display. Means are provided for applying the deflection signals to respective horizontal and vertical beam deflection means of the cathode ray tube such that the writing speed of the beam, in terms of arc deflection increments per unit of time, is a like predetermined constant during scanning of each of the successive ones of the arcs. Means are provided for storing a predetermined like number of display video bits for each of the arcs in the display. As each arc is scanned, the formatted data is displayed. Means are provided for loading the display bits for a given arc into a shift register means prior to the scanning of that arc. A system clock is employed for developing a video clock pulse train having a number of pulses corresponding to the number of display video bits for each arc, with successive ones of the pulses in the video pulse train having a time-position relationship with successive ones of a corresponding number of horizontal deflection linearly incremented beam-defining positions. The shift register means defining the display bits is clocked by this video pulse train, and the bits are displayed in an essentially time-synchronous relationship with respect to the beam position—the synchronous relationship being such that video and beam position are synchronized to within one displayed picture element (video bit) throughout the sector display.

The above and other objects and features of the present invention will become apparent upon reading the following description with reference to the accompanying drawings in which:

FIG. 1 represents a pictorial graph of an arc scanned radar sector display;

FIG. 2, a graphical display of an improved constant writing speed arc scanned display in accordance with the present invention;

FIG. 3, a functional block diagram of a constant writing speed arc scanned deflection generation system and video clock synchronization means, as employed in the present invention;

FIG. 4, a graphical representation of typical X and Y deflection signals linearly decreasing amplitude and linear increasing rate from periphery towards apex of the display, in accordance with the present invention;

FIG. 5, representative waveforms indicating the development of a video clock pulse train for representative arcs throughout the display sector as developed in FIG. 3;

FIG. 6, a graphical representation of a multiplying constant employed in the present invention throughout the scanned arcs by means of which scan rate is increased at an increasing rate for successive arcs from the peripheral one of the arcs toward the apex of the display;

FIG. 7, a functional diagram of video memory RAM means and shift register means by means of which radar data stored in rho-theta format may be synchronously applied to the cathode ray tube of the display;

FIG. 8, a functional block diagram of an alternative means of displaying stored radar data of rho-theta format in a synchronous relationship with the sweep of the cathode ray tube; and FIG. 9, a pictorial representation representing ideal video clock and display data time relationships, together with the practical video clock and ensuing practical displayed picture element positions provided by the present invention.

GENERAL DESCRIPTION OF CONSTANT WRITING SPEED ARC SCAN DISPLAY CONCEPT

A pictorial graph of an arc scan radar sector display is illustrated in FIG. 1. Assuming a displayed sector having M scan lines, the time to display a sector is defined as:

$$t_s = M(t_h + t_r);$$

where:

$t_s$ is the sector scan time, $t_h$ is the time to scan one arc, $t_r$ is the retrace time, and M is the number of arcs scanned per sector.

In present day arc scan systems, $$(t_h + t_r) = \text{constant} = (51.5\mu s + 12\mu s) = 63.5\mu s.$$

The above expression defines a constant horizontal scanning frequency for each of the arcs in the display and thus it is apparent that the writing speed during the scanning of the peripheral one of the arcs is considerably faster than that of successive scanned arcs toward the apex of the display. It is this situation that gives rise to the need in present arc scanned sector displays for brightness compensation since, without compensation, any one brightness setting results in a fading out of the display from the apex of the display to the periphery of the display.

If however, the time to scan one arc, $t_h$, is varied to provide a constant writing speed from displayed sector periphery to apex such that the average time to scan one arc, $t_h$, equals 51.5 microseconds, several benefits emerge:

1. The periphery arc scan writing speed is reduced by a factor of two.
2. Because the periphery arc scan writing speed is reduced by a factor of two, the display brightness increases by a factor of two.
3. Because the periphery arc scan writing speed is reduced by a factor of two, deflection amplifier voltage requirements are decreased by a factor of two.
4. Because the deflection amplifier voltage requirements are decreased by a factor of two, the deflection amplifier power dissipation is effectively reduced by a factor of two.
5. The constant writing speed technique eliminates the need for varying the video amplifier gain during a sector scan.

Considering the above benefits, it may be noted that the deflection amplifier for such a display must provide power which is equated to $\pm Vi_L$ where V is power supply voltage and $i_L$ is the current through the deflection yoke of the display cathode ray tube. The system to be described reduces the rate of change of deflection current (di/dt) by a factor of two since the peripheral arc writing speed has been reduced by a factor of two. Therefore $V_L$ is reduced by a factor of two and power supply voltages for the deflection amplifier can be reduced by a factor of two. Since power is equated to $\pm Vi_L$, the voltage dissipation is cut by half. The system to be described then uniquely doubles the brightness of the display and halves the power requirement, while elminating the need for brightness compensation.

As will be apparent from the ensuing description, the constant writing speed arc scan sector display of the present invention introduces a penalty of sorts, in that the video frequency response must be increased toward the apex of the display. Theoretically, the video frequency response must be increased towards infinity as the apex itself is being drawn on the cathode ray tube. This penalty however can be circumvented by not displaying lines of data near the apex, which alternative is a practical solution for weather radar. In the particular embodiment to be described herein, the last one-eighth of the lines nearest the apex per se of the sector are not displayed, and it will be seen that this choice may be practical for a weather radar display, where radar video data corresponding to short ranges may be eliminated from the display without detrimentally impairing useful information content.

GENERAL DESCRIPTION OF CONSTANT WRITING SPEED ARC SCAN SECTOR EMBODIMENT

FIG. 2 is a pictorial display of a constant writing speed radar sector display. The display is depicted for a sector composed of 256 discrete angular antenna positions and 256 discrete picture elements (pixels) of information for each angular antenna position. In arc scan display, there are then 256 arcs to be scanned and 256 pixels of displayed data per scan. Since the 32 arcs of the display nearest the apex (the last one-eighth of the scans nearest the apex) are not scanned in the embodiment depicted in FIG. 2, the number of displayed arc-scans is seven-eights of 256 or 224 arc scans. As will be further described, a two-to-one interlace system may be used such that only one-half of the 224 arc scans, or 112 arcs, need to be drawn for each of the respective even and odd fields of the interlace system, and no detected radar information is lost in the display except at the apex end of the display. In the embodiment to be described and as depicted in FIG. 2, arc scan periods are defined by successively diminishing horizontal scan times from the periphery towards the apex plus a constant 12-microsecond retrace period. The peripheral arc depicted in FIG. 2 is defined as having a horizontal scan time of 128 microseconds, while arc #128 horizontal scan time is 64 microseconds, arc #64 horizontal scan time is 32 mircoseconds, and the last displayed arc towards the apex of the display has a horizontal scan time of 16 mircoseconds.

In the embodiment to be described, the deflection signals are generated digitally, with subsequent analog conversion to develop X and Y deflection signals appropriate to realize the pictorial display of FIG. 2. Digital means for generating the X and Y deflection signals of the system are functionally depicted in FIG. 3, with the waveforms of the X and Y deflection signals shown in FIG. 4. Reference to FIG. 4 indicates that the Y deflection signal is defined as $A_n \cos \omega_h t$, which may be expressed as $$A_n \cos (2\pi \frac{1}{t_h}) t.$$

The X deflection signal may be defined as $A_n \sin \omega_h t$, which may be expressed as $$A_n \sin (2\pi \frac{1}{t_h}) t.$$

It is noted with reference to FIG. 4 that the deflection frequency is increased and amplitude is decreased as the radar sector is displayed from periphery to apex, in order to maintain the desired constant writing speed. FIG. 4 depicts a peripheral one of the arcs to be drawn as having an amplitude $A_1$, with successive arcs toward the apex having successively linearly decreased amplitudes $A_3$, $A_5$, $A_7$, etc. It should be noted that the pictorial representation of the X and Y deflection signals illustrated in FIG. 4 depicts those signals for the odd field of an interlaced display, it being realized that the even field X and Y deflection signals would have amplitude factors $A_0$ (the greatest amplitude factor), $A_2$, $A_4$, $A_6$, etc. FIG. 4 further depicts that the time to scan each arc ($t_h$) decreases linearly from the peripheral arc towards the apex with each successive arc scan time period being preceded by a fixed retrace period $t_r$.

GENERAL DESCRIPTION OF CONSTANT WRITING SPEED DIGITAL SWEEP VOLTAGE GENERATION

Now referring to the digital implementation by means of which the desired X and Y deflection signals may be generated to realize a constant writing speed throughout the arc sector scan display, and with reference to FIG. 3, the embodiment may generally be defined as a digital means of generating the X and Y deflection signals depicted in FIG. 4 such that successive ones of the arcs drawn from periphery towards apex of the sector scan have linearly decreased arc scan times $t_h$. For this purpose, the sweep system digital means to generate the $A \sin \omega t$ and $A \cos \omega t$ deflection signals definitive of each of the arcs in the display. A line counter is employed, which keeps track of which arc in the display is being drawn and from this counter is developed a digital representation of the amplitude term (A) peculiar to each of the arcs. A digital representation of the $\omega$ term in the X and Y deflection expressions is developed. A digital representation of t and a digital representation of $\omega t$ are developed. A digital representation of $\sin \omega t$ and $\cos \omega t$ are developed, followed by an appropriate multiplication of $\sin \omega t$ and $\cos \omega t$ terms by the amplitude term A to arrive at analog X and Y deflection signals $A \sin \omega t$ and $A \cos \omega t$. The amplitude term A is linearly decreased from periphery towards apex and the $\omega t$ term defines a linearly increasing frequency from periphery towards apex.

GENERAL DESCRIPTION OF SYNCHRONIZATION BETWEEN DEFLECTION SIGNALS AND VIDEO

Since each of the successive arcs drawn from periphery towards apex are at increasingly greater scanning frequencies, and for each of the arcs a similar number (herein chosen as 256) of video information bits must be properly drawn at the correct position along each of the arcs, the system of FIG. 3 includes a means for developing a video clock pulse train which bears a time synchronous type of relationship with the scanning frequency, with the video clock pulse train being utilized to read out video bits stored for an arc being drawn in their proper time position on that arc. For this purpose, the system of FIG. 3 employs further digital means responsive to the digital representation of $\omega t$ developed in the sweep generating circuitry to gate predetermined ones of the pulses of a fixed frequency clock pulse train as video clock pulses, with the video clock pulses being time synchronous with ideally displayed video pixel positions to within one pixel throughout each of the arcs. That is to say, during the scanning of each arc, a video clock pulse train is developed which is comprised of 256 selected ones of pulses from a clock pulse source. The time positions of the selected clock pulses bear essentially a time synchronous relationship with the proper display positions for each of the 256 video information pixels. Then, assuming for the moment that a shift register contains the 256 video bits for the arc being drawn on the display, the video clock pulse train is utilized to shift the 256 bits out of the shift register into nearly ideal positions along the arc. As will be further described, the synchronization between sweep and video is accomplished with relatively simple digital circuitry and utilizes but a single frequency clock source in developing a video pulse train the bit rate of which increases linearly for successive arcs being scanned from periphery towards the apex of the display—as opposed to the necessity of developing a discretely different greater clock frequency for each of the successive arcs to be scanned.

DETAILED DESCRIPTION OF SWEEP GENERATING CIRCUITRY

Previous discussion has indicated the need for developing X and Y deflection signals comprised of sinusoidal waveforms the amplitude of which decreases linearly as successive arcs are scanned from periphery towards the apex, and the frequency of which increases linearly as successive arcs are scanned from periphery towards apex. In the analog world it is relatively simple to vary the amplitude of a sine wave such as, for example, by utilizing a potentiometer or an amplifier gain adjustment. It is also relatively easy in the analog world to vary the frequency of a sinusoidal waveform by employing, for example, a variable frequency oscillator. However, to both vary the amplitude and the frequency in perfect synchronism, as is necessary in the system being herein described, is not simple in the analog world. Therefore the sweep generating embodiment depicted in FIG. 3 employs digital means whereby the deflection waveforms experience a linearly increased frequency and synchronously linearly decreased amplitude in an exacting linear relationship as arcs are scanned from the periphery towards the apex, with the frequency increasing and the amplitude decreasing, both at the same rate.

Figure 1:
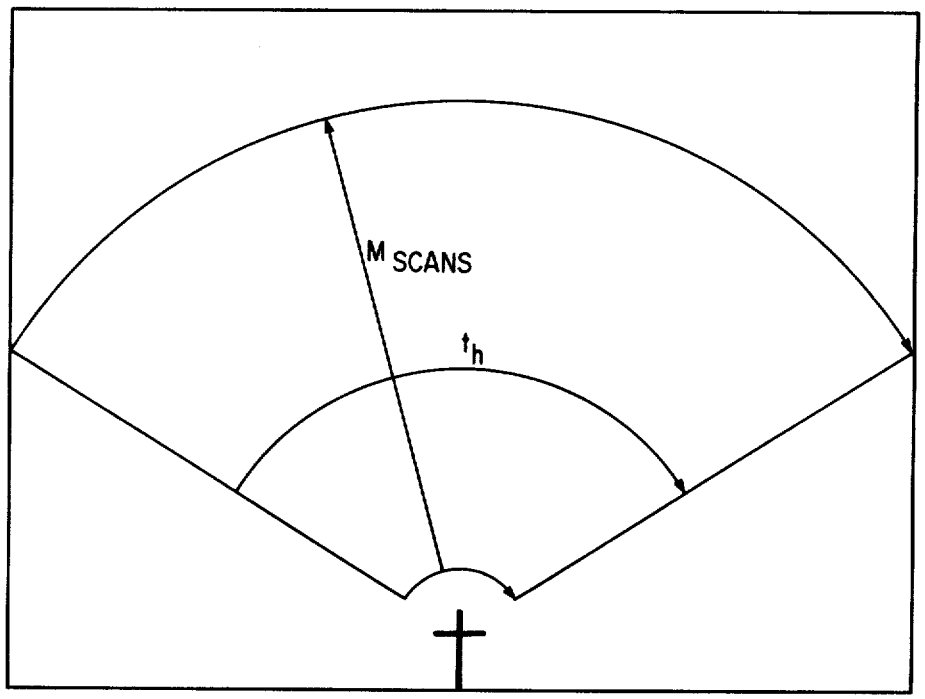
Figure 2:
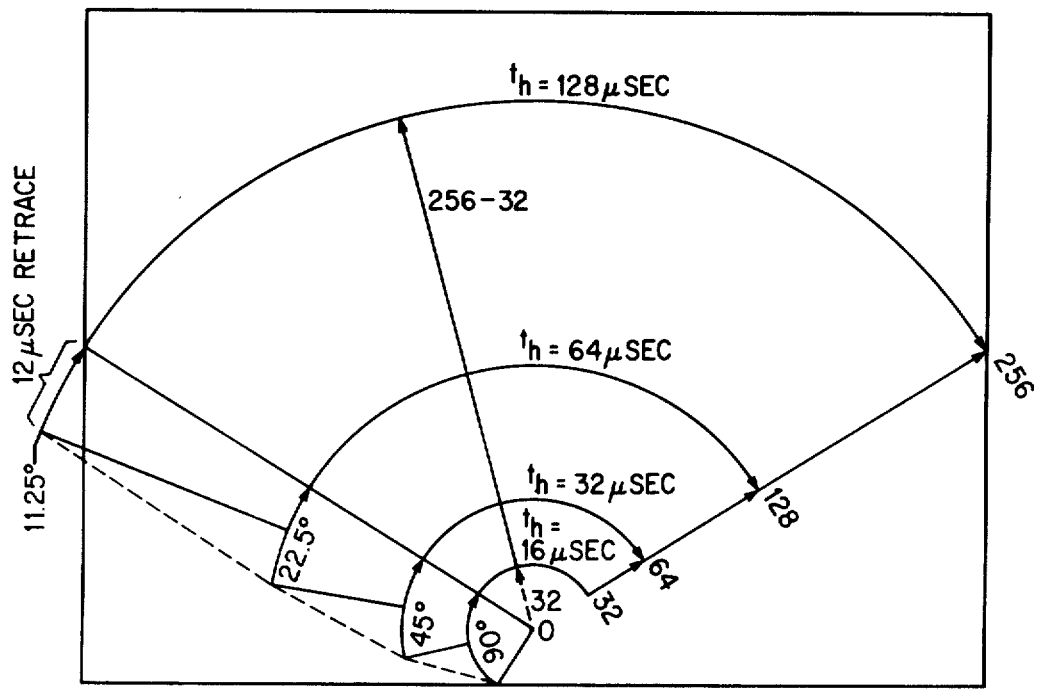
Figure 3:
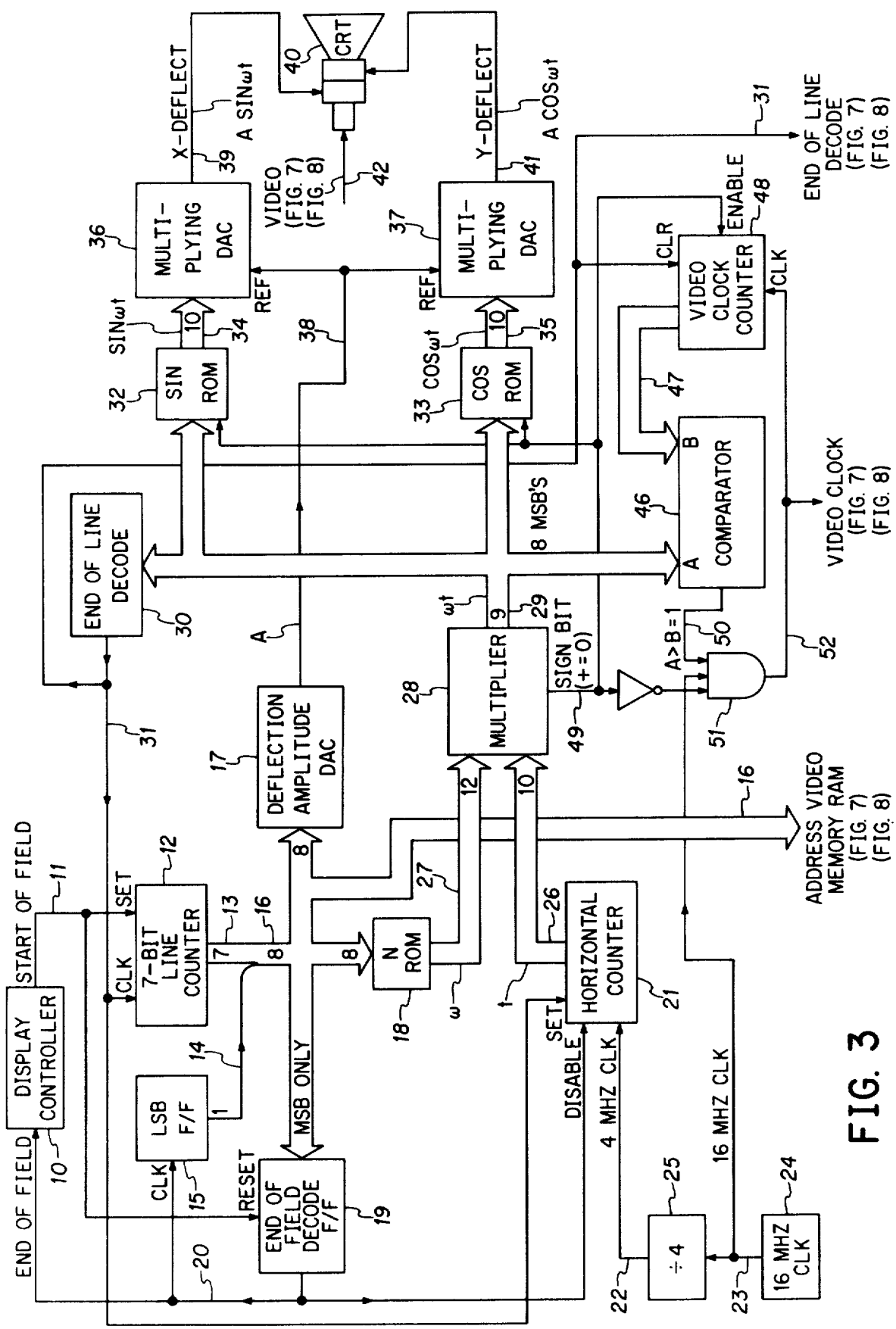
Figure 4:
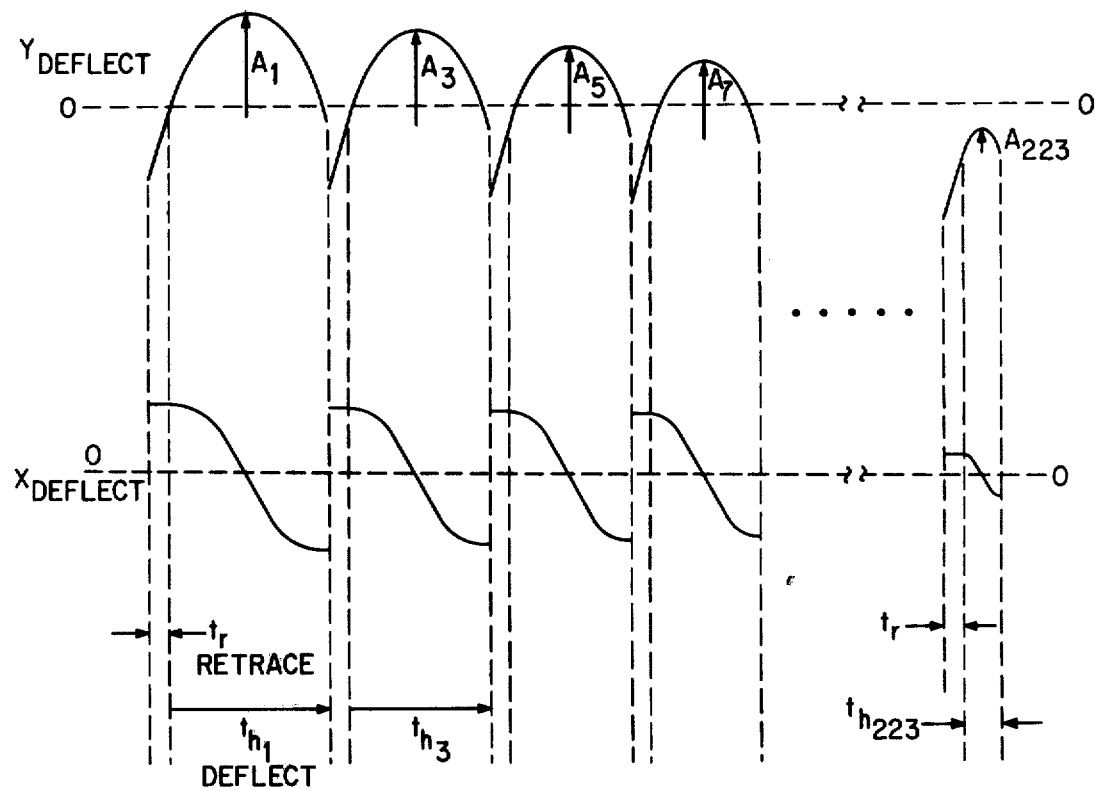

Referring now to the X and Y deflection signal development in FIG. 3, a display controller 10 generates a start of field signal 11 which is applied as a SET input to a seven-bit line counter 12. Line counter 12, in the embodiment to be described, is then preset to binary count 16. A seven-bit output 13 from line counter 12 is combined with a further least-significant bit on output line 14 from a least-significant bit flip-flop 15, with the combined eight-bit count 16 being applied as an input to a deflection amplitude digital-to-analog converter 17 and N-ROM 18. The most-significant bit only of the eight-bit count on line 16 is applied to an end-of-field decode flip-flop 19. The output 20 from the end-of-field decode flip-flop 19 is applied as a controlling input to the display controller 10 as well as a disabling input to a horizontal counter 21. Horizontal counter 21 receives a 4-MHz clock input 22 which is obtained by dividing the output 23 of a 16 MHz clock source 24 in frequency divider 25. The output 26 from horizontal counter 21 and the output 27 from the N-ROM 18 are applied as respective inputs to a digital multiplier 28. Output 29 from multiplier 28 is applied as an input to an end-of-line decode 30 the output 31 of which is applied as a clock input to the seven-bit line counter 12 and as a SET input to horizontal counter 21. Output 29 from multiplier 28 is applied as input to a sine function ROM 32 and to a cosine function ROM 33, with respective outputs 34 and 35 from the sine and cosine ROM's being applied as respective inputs to multiplying digital-to-analog converters 36 and 37. Multipliers 36 and 37 receive a common analog input 38 from the deflection amplitude digital-to-analog converter 17. Output 39 from multiplying DAC 36 comprises the X deflection signal which is applied to the yoke of the cathode ray tube 40, while output 41 from multiplying DAC 37 is applied as the Y deflection signal to the yoke of cathode ray tube 40.

Cathode ray tube 40 is supplied with a video input 42 which comprises 256 radar video bits during the scanning of each of the successive arcs in the sector scan.

In operation, a start of field signal 11 from the display controller 10 loads binary count 16 into line counter 12. The most-significant bit output from line counter 12 is applied to the end-of-field decode flip-flop 19 to cause the end-of-field decode flip-flop to unlatch. Line counter output 16 provides an address code to N-ROM 18, and also provides a code to the deflection amplitude digital-to-analog converter 17. The unlatched end-of-field decode, as experienced in output 20 from end-of-field decode flip-flop 19, disables the horizontal counter 21 which, having been preset to a retrace address (in the embodiment to be described, to binary minus 48) by a previous end-of-line decode, begins to count via the 4-MHz clock input 22. The implementation herein described is designed for a twelve-microsecond retrace, and therefore horizontal counter 21 will have been preset by the previous end-of-line decode to binary minus 48.

In response to the binary 16 address input which is initially loaded into the seven-bit line counter 12, the N-ROM 18 generates a multiplier digital word to be used by the digital multiplier 28 in order to variably increase the frequency as the displayed sector is being arc scanned from periphery toward apex. The N-ROM code utilized is tabulated in short form in Table 1. Referring to Table 1, it is noted that the N-ROM multiplier word is defined as the total number of arcs in the sector (256) divided by that number (256) less the number of arcs each particular arc is displaced from the peripheral one of the arcs. Thus the top or peripheral arc (number zero) defines an N-ROM multiplier output of 1.000000 as the addressed output from N-ROM 18 in response to the peripheral arc being drawn, with the line counter least-significant bit output 14 from the least-significant bit flip-flop 15 being zero. The seven-bit output 13 from line counter 12 is binary 16, which, when combined with the least-significant bit 14, develops an eight-bit output on line 16 corresponding to binary 32, which is the N-ROM address for the N-ROM output of 1.0000. Similarly, considering the even field of the interlace, arc number 2 is maintained with a line counter least-significant bit output of zero, defining a seven-bit line counter output 13 of 17 and an N-ROM address of 34 which addresses a multiplier output from the N-ROM which is defined as 256/(256−2), equaling 1.007874. The last arc in the even interlace field (arc number 222) is defined by a seven-bit line counter output of 127, which develops an N-ROM address output of 254 to output an N-ROM multiplier word defined as 256/(256−222) or 7.529411.

TABLE I

| ARC No. | LINE COUNTER LSB | LINE COUNTER | N-ROM ADDRESS | N-ROM OUTPUT |
|---|---|---|---|---|
| EVEN INTERLACE | | | | |
| 256−256 = 0 | 0 | 16 | 32 | 256 ÷ (256−0) = 1.000000 |
| 256−254 = 2 | 0 | 17 | 34 | 256 ÷ (256−2) = 1.007874 |
| 256−252 = 4 | 0 | 18 | 36 | 256 ÷ (256−4) = 1.015873 |
| , | , | , | , | , |
| , | , | , | , | , |
| , | , | , | , | , |
| 256−34 = 222 | 0 | 127 | 254 | 256 ÷ (256−222) = 7.529411 |
| ODD INTERLACE | | | | |
| 256−255 = 1 | 1 | 16 | 33 | 256 ÷ (256−1) = 1.0039215 |

TABLE I-continued

| | | | | |
|---|---|---|---|---|
| 256−253 = 3 | 1 | 17 | 35 | 256 ÷ (256−3) = 1.011853 |
| , | , | , | , | , |
| , | , | , | , | , |
| , | , | , | , | , |
| , | , | , | , | , |
| 256−33 = 223 | 1 | 127 | 255 | 256 ÷ (256−223) = 7.757575 |

N-ROM multiplier output words for the odd interlace are outlined in Table 1. Here the line counter least-significant bit from the least significant bit flip-flop is binary one (having been toggled by an end-of-line decode signifying end of line zero). This binary one bit, when combined with respective seven-bit line counter outputs from 16 through 127, develops N-ROM addresses from 33 through 255, defining N-ROM output multiplier words from 1.0039215 through 7.757575. As will be further appreciated, the N-ROM output mulip-lier words, for a next successive odd or even arc towards the periphery, roll over to a number greater than eight, which for the particular embodiment is a limiting number not desired, and not employed.

It is seen that the N-ROM generates a multiplier word to be used by the digital multiplier which is peculiar to, and maintained throughout the drawing of one of the successive arcs in the scan, in that each multiplier work outputted from the N-ROM is in response to a particular related address input assigned to one of the successive lines in the scan. The N-ROM generates this multiplier word to be used by the digital multiplier in order to variably increase the frequency as the displayed sector is being arc scanned from periphery toward the apex. The output multiplier word 27 from N-ROM 18, and the multiplicand output 26 from the horizontal counter 21, are applied as respective inputs to the digital multiplier 28. The output 29 of multiplier 28 is then a linearly increasing binary word during the scanning of each arc, and the rate of increase becomes larger as the sector is displayed from periphery to apex. Multiplier 28 develops a nine-bit magnitude output 29 and a sign-bit output 49 which collectively increases from minus 48×N to zero to plus 511 to define the sine/cosine ROM addresses to develop the trigonometric sine/cosine waveforms from minus θ° retrace to minus 60° through plus 60° scan. The nine-bit output 29 and the sign-bit output 49 from multiplier 28 are seen to be applied as addressing inputs to sin ROM 32 and cos ROM 33. Outputs from these respective ROM's therefore correspond to the sine and cosine of the deflection angle. In effect, as depicted in FIG. 3, and considering the output X deflection signal A sin ωt and Y deflection signal A cos ωt, the output from the N-ROM 18 is a binary representation of ω, the output from the horizontal counter 21 is a binary representation of t, the output from multiplier 28 is a binary representation of ωt, and the outputs from the sine and cosine ROM's 32 and 33 are binary representations of sin ωt, and cos ωt, respectively. The amplitude term A comprises the output 38 of the deflection amplitude digital-to-analog converter 17 which is a binary representation of this amplitude. Deflection amplitude digital-to-analog converter 17 may be the type generating a decreasing output in response to an increasing binary word input, and thus the amplitude A decreases linearly as the arcs are scanned from periphery toward apex. The output 34 from sin ROM 32 and the output 38 from the deflection ampli-tude DAC are applied to a multiplying DAC 36 to output an analog deflection signal A sin ωt, where A linearly decreases as arcs are scanned from the periphery towards the apex, while ωt linearly increases. Correspondingly, the output 41 from multiplying DAC 37 is an analog Y deflection signal A cos ωt, where A decreases linearly and ωt, increases linearly as arcs are scanned from the periphery towards the apex.

The particular implementation herein described is designed for 512 discrete trigonometric deflection increments for the outer periphery arc scan, and the end of each scanned arc is defined by the output 29 of multiplier 28 rolling over from some binary number N to a number greater than 511. This roll-over is sensed by the end-of-line decode block 30 and is utilized to increment the line counter and set the horizontal counter 21 to the binary minus 48 retrace number. Operation continues in this fashion until the line counter rolls over from binary 127 to binary 128 which is defined by the most-significant bit of the output of the line counter, which as applied to end-of-field decode flip-flop 19, causes output 20 to disable the horizontal counter 21, informs the controller 10 that a field of display has been completed, and toggles the line counter interlace least-significant bit flip-flop 15 in preparation for the next field of scan. Multiplier 28 reaches the roll-over count in successively lesser period of time as arcs being scanned (defined by the addressing output on the line counter) are nearer the apex of the display, since, as previously mentioned with reference to Table 1, the value of the N-ROM multiplier word increases as arcs are scanned toward the apex.

Figure 6:
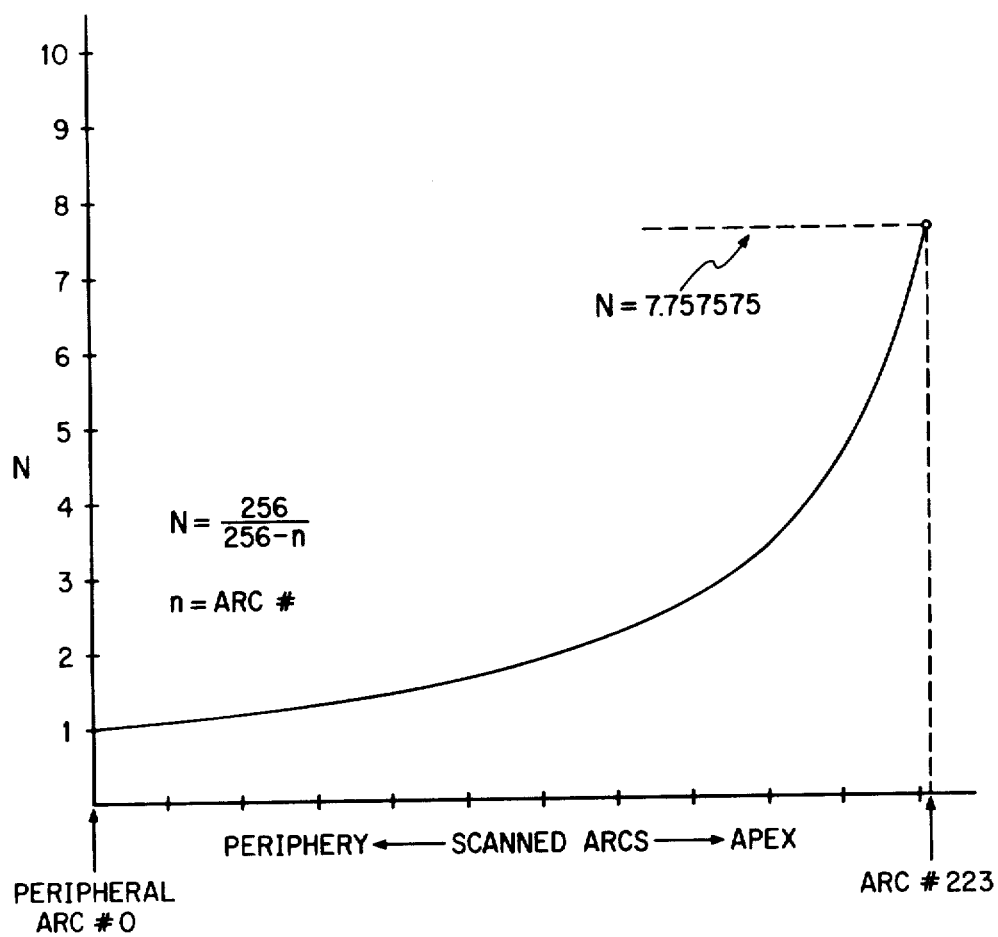

Reference is made to FIG. 6 which depicts the function N from the value of unity for peripheral arc number zero to the most apex oriented arc 223. It is seen that the value of N increases at an ever increasing rate, and thus, as this value of N for any particular arc scanned is greater, the product of this number and the output of the linearly incremented horizontal counter increases at a correspondingly rapid rate, such that the roll-over count of 511 in multiplier 28 is reached proportionally sooner.

DETAILED DESCRIPTION OF DEFLECTION/VIDEO SYNCHRONISM

Figure 7:
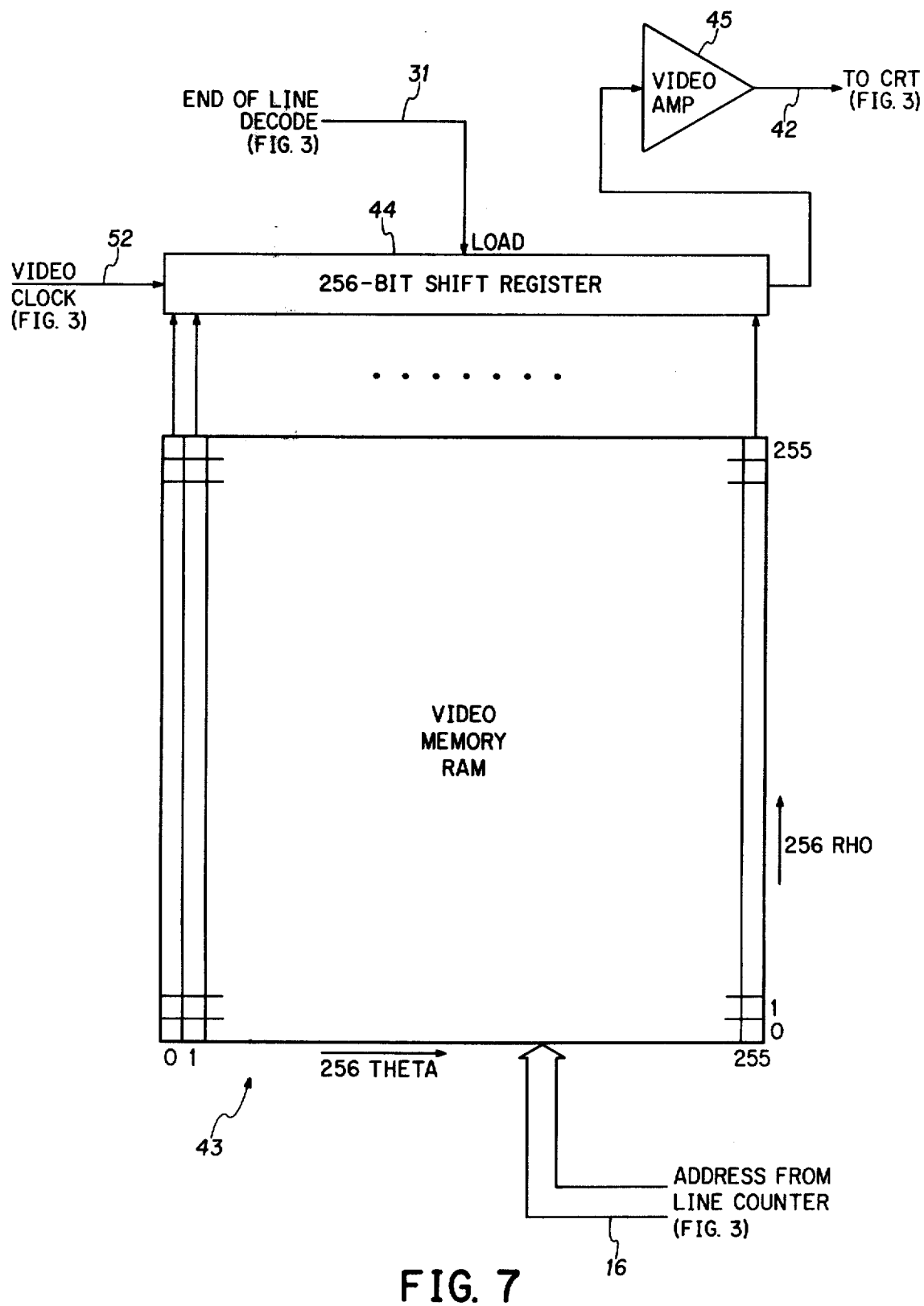

The development of X and Y deflection signals to realize the objectives of constant writing speed in the arc scan display having now been described, it remains to describe how to achieve a properly synchronous relationship between the deflection signal and the 256 pixels of radar information which are to be displayed in proper time position along successive ones of the arcs, bearing in mind that arcs are drawn with successively increased scanning rates from periphery towards the apex of the display. Reference is made briefly to FIG. 7 which depicts a functional block diagram of a radar video memory RAM 43 and an implementation of reading data from the memory RAM 43 in synchronism with the deflection signals. Writing data into memory 43 is not depicted in FIG. 7, nor will it herein be discussed, since the writing of data in p/θ format into such memories is widely described in the art.

Referring then to FIG. 7, the output 16 from the line counter, as developed in FIG. 3, is utilized to address a particular ρ field of data to be read out during the scanning of a particular arc. Data is read from memory 43 at the line counter address and loaded into a video buffer register (shift register) 44, which might comprise, as depicted in FIG. 7, a 256-bit shift register. The corresponding 256 bits of ρ data must subsequently be shifted to the cathode ray tube video amplifier 45 in synchronism with the deflection such that they are displayed in their proper position along the arc, that is, at proper angular positions along the arc. As previously pointed out, the scanning rate is not constant, rather the scanning rate increases for each of the successive arcs from the periphery towards the apex. Perfect synchronism imposes the need for a video clock generator means providing a discretely different clock rate for each arc in the display, such that 256 clock pulses are defined during the scanning time of each arc. For the embodiment described herein, this would comprise 223 sources of clock pulses, each at a discretely different frequency. The present invention precludes the obvious burden of such an implementation, and uniquely develops, from a single clock source of a fixed frequency, a train of video clock pulses which bears essentially a synchronous relationship with the deflection signal for each of the arcs being scanned. Actually, as will be described, a perfect synchronism is not achieved other than during scanning of the peripheral arc, when the N-ROM output is 1.0000000 and the horizontal counter counts to a full 512 count. However synchronism is realized to the extent that video resolution is within one pixel throughout each of the successive scans, and thus does not detrimentally effect display resolution. As will be seen, lack of perfect synchronism between video clock pulses utilized to shift the information bits out of memory and ideal video displayed pixel positions on the display, is masked by the resolution capability of the display when considering the fact that 256 information bits are displayed along each arc.

Referring now again to FIG. 3, deflection/video synchronism is achieved by a video clock development employing a deflection/video clock comparator. Output 29 from multiplier 28 is seen to be applied as an input A to comparator 46. Since the nine-bit output from multiplier 28 represents a binary count from zero to 511 for each arc being written on the cathode ray tube, and we are concerned with the positioning of 256 radar pixels along each arc, only the eight most-significant bits of the output 29 from multiplier 28 are applied to the comparator 46; these eight most-significant bits representing counts from zero through 255 during the scanning of each arc. A second input B to comparator 46 comprises the output 47 of a video clock counter 48. Video clock counter 48 is reset to zero by each end-of-line decode sensed on output 31 of the end-of-line decode block 30, and video clock counter 48 is not enabled until the 12-microsecond retrace period is completed, as evidenced by the sign bit output 49 from multiplier 28 defining a plus output from multiplier 28; that is, plus equals zero. On completion of the 12-microsecond retrace period, the output from horizontal counter 21 is zero, which defines a zero output from multiplier 28 and thus corresponds to the start (enable) in the video clock counter. As soon as the next count is incremented in the horizontal counter, resulting in a +ΔM in the multiplier output 29, the deflection/video clock comparator 46 outputs a signal 50 indicating that the multiplier output, as applied to the A input of comparator 46 is larger than the number then stored in the video clock counter 48. This enables AND gate 51 to pass one or more 16-MHz clock pulses 23 onto video clock output line 52 to thus increment video clock counter 48 until a comparison is achieved between the multiplier output as applied to the comparator 46 and the output 47 from the video clock counter. The 16-MHz clock pulse cycles are also applied as the video clock input to the 256 bit shift register of FIG. 7 to shift binary video to the video amplifier 58. Since the binary number defined by the eight most-significant bits of the output 29 of multiplier 28, as applied to the comparator 46, linearly advances from zero to plus 255, the video clock counter 48 will linearly advance from zero to plus 255, thereby generating the necessary 256 video clock cycles required to shift the 256 pixels of video information from the video shift register to the video amplifier.

Figure 5:
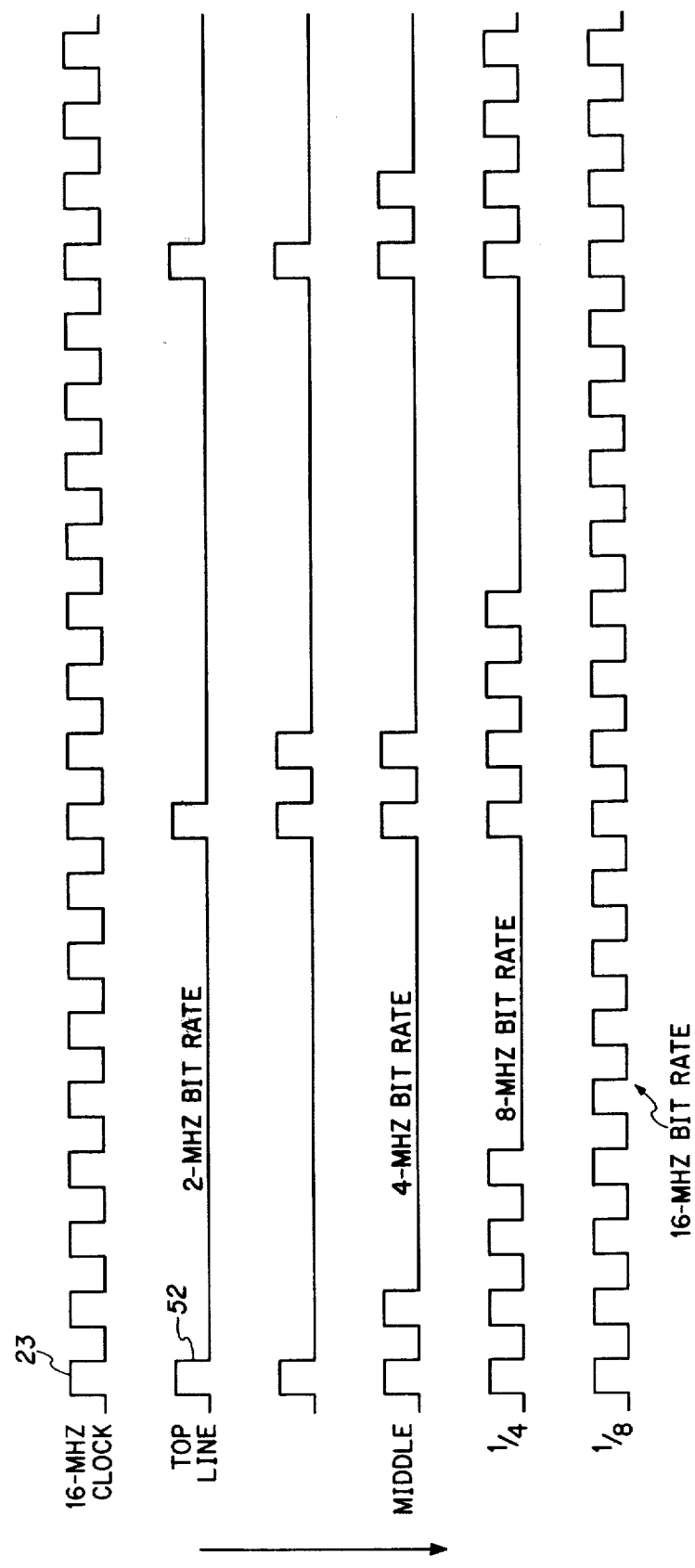

Reference is made to FIG. 5 wherein the 16-MHz clock output 23 is shown in timed relationship with selected ones of the video clock pulses developed during scanning of the top line or peripheral arc, during scanning of an arc intermediate to the peripheral arc and the middle arc, and during scanning of arcs displaced one-fourth and one-eighth from the display apex. For the top line of the display, where the multiplier word output from the N-ROM is 1.000000, every eighth one of the 16-MHz clock pulses 23 is gated through AND gate 51 as a video clock pulse, resulting in a 2-MHz bit rate video clock. For the exampled line between the peripheral arc and the middle arc, the N-ROM multiplier word will cause filler clock pulses to be gated onto the video clock line, in addition to every eighth one of the 16-MHz clock pulses. In the middle of the display, every eighth 16-MHz clock pulse is gated as a video pulse, each followed by a next succeeding 16-MHz pulse, resulting in a 4-MHz bit rate. At the line displaced one-fourth of the display from the apex every eighth one of the 16-MHz clock pulses is gated, each followed by three next-successive ones, resulting in an 8-MHz bit rate. At the most apex-oriented arc in the display, all of the 16-MHz clock pulses are gated through AND gate 51 as video clock pulses. In the embodiment herein described, 16-MHz is the maximum video clock rate that can be obtained, and the drawing of arcs closer than one-eighth from the apex would command video clock rates in excess of the 16-MHz clock and thus deflection/video synchronism would not be further extended toward the display apex. Synchronism, for further arcs being displayed towards the apex would necessitate an increase in the clock rate from the embodied 16-MHz clock. For example, a 32-MHz clock might be employed, with the displayed arcs maintaining proper synchronism into one-sixteenth from the display apex.

ALTERNATE STORED VIDEO READOUT EMBODIMENT

Figure 8:
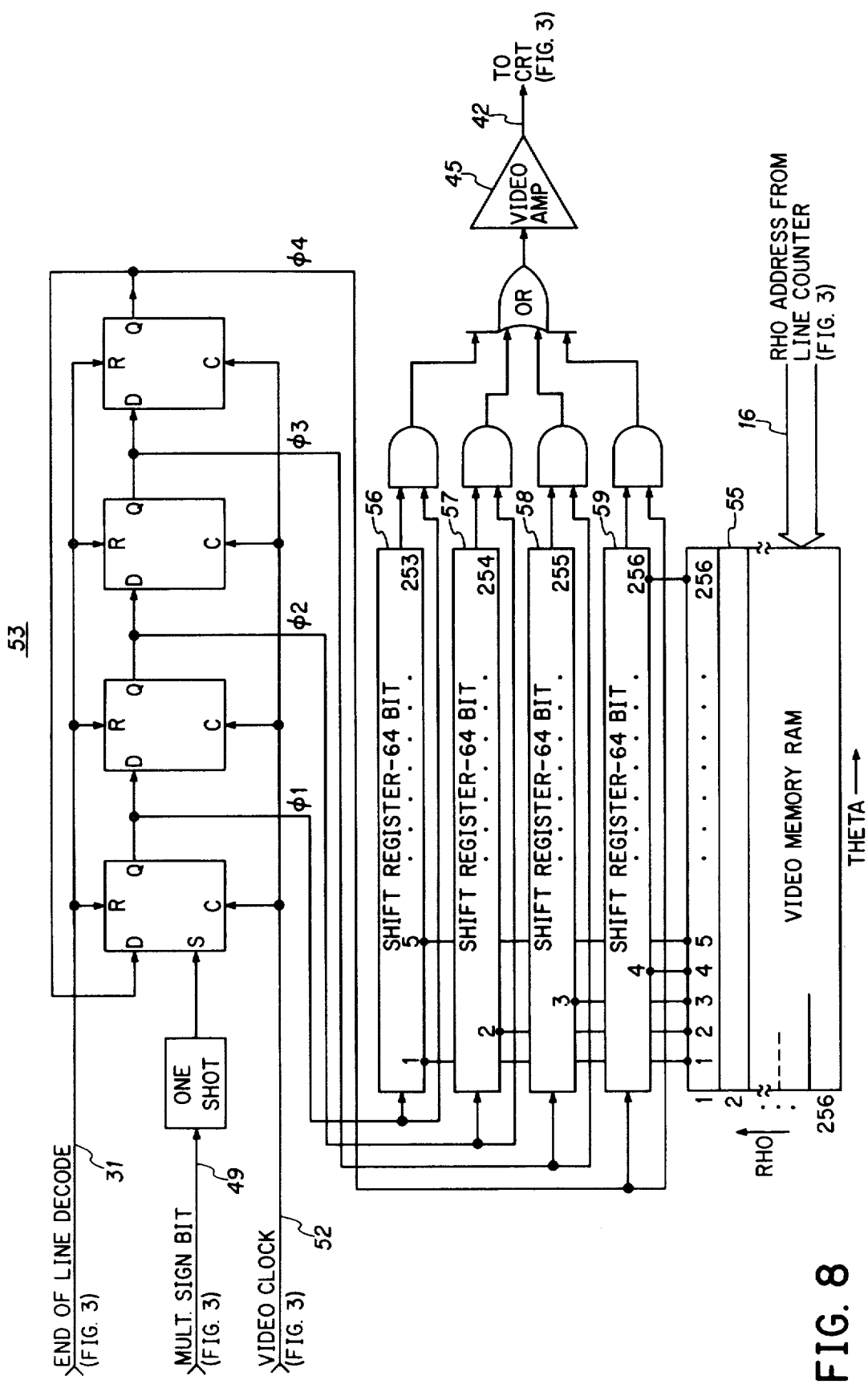

The 256 video clock pulses developed during the scanning of each of the successive arcs in the display has been described, with reference to FIG. 7, as being applied as a clock input to shift a 256-bit shift register into which the radar video bits are stored for the particular arc being drawn. A preferred arrangement for clocking stored video is depicted in FIG. 8, where the video clock pulses 52 are applied to a four-phase clock generator 53 to develop a four-phase clock output designated $\phi1$, $\phi2$, $\phi3$, and $\phi4$. In this embodiment, video memory RAM 55 is employed with the addressing input 16 from the line counter of FIG. 3 utilized to read the video bits in the memory into four 64-bit shift registers 56, 57, 58, and 59.

In response to an addressing input 16 from the line counter, the 256 bits of video to be displayed along that arc are entered into the plural shift registers 56–59. As generally depicted, bits 1, 5, 9 --- 253 are entered into shift register 56. Bits 2, 6, 10 -- 254 are entered into shift register 57. Bits 3, 7, 11 -- 255 are entered into shift register 58. Bits 4, 8, 12 --- 256 are entered into shift register 59. In response to the four-phase clock output $\phi1$-$\phi4$ from four-phase clock generator 53, video bits (pixels) are sequentially shifted from shift registers 56–59. Each shift register output is ANDed with the clock line utilized as the shift input to that shift register, with the outputs from the AND gates applied through an OR gate to the cathode ray tube video amplifier 45. With the embodiment of FIG. 8, the maximum imposed 16-MHz video bit rate imposes but a 4-MHz bit rate maximum on each of the shift registers. Further, using 64-bit shift registers imposes a lesser hardware requirement than a single 256-bit shift register as described in FIG. 7.

Figure 9:
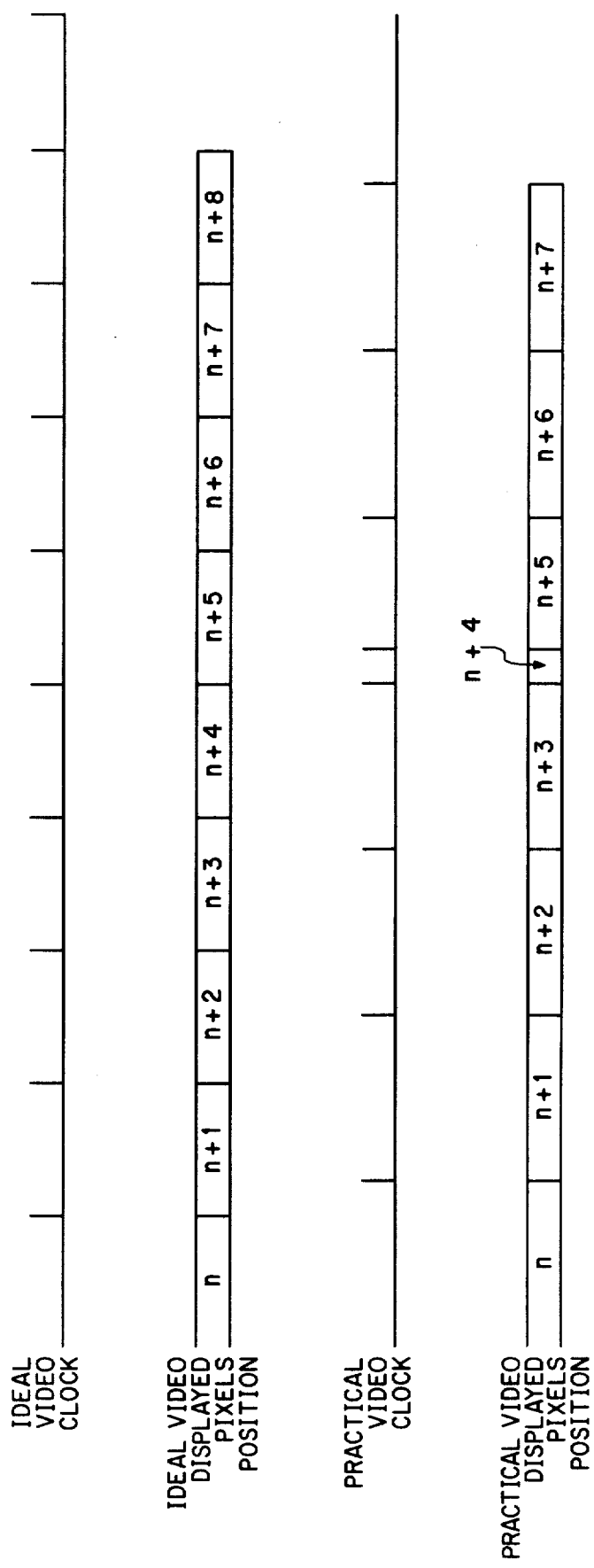

Referring now to FIG. 9, an illustrative portion of the displayed pixel positions for a particular arc being drawn is pictorially indicated. An ideal video clock is depicted in perfect synchronism with ideal video display pixel positions. Pixel positions are indicated by n, n+1, n+2, etc. The practical video clock described herein is depicted as providing a synchronous-like relationship between video clock and displayed pixel positions, with each of the practical video clock pulses being within one pixel of synchronism throughout the scanning of the arc.

The present invention is thus seen to provide an arc scan sector display wherein a constant writing speed is obtained by increasing the scanning rate as arcs are scanned from periphery towards the apex of the display. Multifold advantages of the constant writing speed display over the conventional constant sweep rate arc scan displays known in the art have been realized. A practical synchronization between video readout and sweep position to maintain proper display positions of video pixels for each of the arcs is provided by gating predetermined ones of pulses from a single clock source as video clock pulses to read stored video information for the arc, such that a proper time-position relationship between video and sweep position is realized. The practical video clock herein described, utilizing minimal digital hardware requirements, uniquely maintains a sufficient degree of synchronism between sweep position and video pixel display position without impairment of display resolution.

Although the present invention has been described with respect to a particular embodiment thereof, changes might be made therein which fall within the scope of the invention as defined by the dependent claims.

What is claimed is:

1. A constant writing speed arc-scanned cathode ray tube display, comprising first counter means for developing a linearly increasing count corresponding to successive arcs to be scanned including a first peripheral one of said arcs, means for generating in response to each successively outputted count from said first counter means a binary word defined by $N \div (N-n)$, where N is the total number of arcs definable from periphery to apex of said arc-scanned display and n is the number of arcs each successive arc is displaced towards the apex of said display from said peripheral one of said arcs; means for developing a second linearly increasing count corresponding to successive ones of horizontal position increments along each said arc; means for multiplying said binary word by said second linearly increasing count; means responsive to the output of said means for multiplying and the output from said first counter means to generate respective horizontal and vertical deflection signals effective to cause the beam of said cathode ray tube to scan successive ones of said arcs, said last named means comprising respective ROM's addressed by the output of said means for multiplying to develop outputs respectively equated to the sine and cosine functions of the angle subtended by successive ones of said horizontal position increments along each said arc, and further means for multiplying each of the outputs from said ROM's by the output from said first counter means to develop respective vertical and horizontal deflection defining outputs, whereby said cathode ray tube beam is caused to scan each successive arc from the peripheral one of said arcs with a constant writing speed.

2. The system of claim 1, further comprising a video clock pulse counting means, means for comparing the output of said means for multiplying with the output of said clock pulse counting means; a source of clock pulses; means for gating predetermined ones of said clock pulses to said video clock pulse counting means, and means for enabling said gating means in response to a predetermined output from said means for comparing, as defined by the output of said means for multiplying, being greater than the output of said clock pulse counting means; the output from said means for gating comprising a predetermined like number of said video clock pulses during the scanning time of each successive arc, whereby the bit-rate of said video clock pulse output from said means for gating increases at an increasing rate during scanning of successive arcs from periphery toward apex of said arc-scan display.

3. The system of claim 2, further comprising shift register means, storage means for storing a like number of display video words for each arc of said display, said number of display video words equalling that of said number of said video clock output pulses generated during each arc-scanning time, shift register means, means for addressing said storage means with successive outputs from said first counter means to write the video words stored for each successive displayed arc into said shift register means, means for clocking said shift register means with said video clock pulse output, and the output of said shift register means applied to video amplifier means associated with said cathode ray tube, whereby the display video words are displayed in a time-coincident relationship with associated horizontal sweep positions for each of the successive arcs of said display.

4. The system of claims 2 or 3 with means for clocking said first counter means in response to the output of said means for multiplying exceeding a predetermined count definitive of the number of horizontal deflection increments for each of said arcs in said display.

5. The system of claim 4 with said means for developing said second count comprising a second counter means, means for clocking said second counter means by a predetermined sub-multiple of said clock pulse source, and means for resetting said second counter means to a predetermined start count in response to each successive clocking of said first counter means.

6. The system of claim 5 comprising means for receiving a field initiation control pulse, flip-flop latch means responsive to said field initiation control pulse to output an enabling signal to said second counter means, and responsive to overflow of said first counter means to output a disabling signal to said second counter means.

7. The system of claim 6, with even numbered ones of said arcs in said display comprising a first display field and odd numbered ones of said arcs comprising an interlaced second display field, field interlace control means for causing said first counter means to alternately output successive counts corresponding to successive even numbered arcs in said display and odd numbered arcs in said display comprising a further flip-flop means, means for clocking said further flip-flop means in response to said enabling output of said flip-flop latch means to develop an output of first logic level and, in response to said disabling output of said flip-flop latch means, to develop an output of second logic level; with the output of said further flip-flop means being combined with, and comprising the least significant bit of, the output from said first counter means.

8. A cathode ray tube sweep system comprising means for generating running digital counts respectively comprising horizontal and vertical deflection increments for a plurality of scan lines comprising a scan field, wherein a predetermined like number of horizontal increments define each successive horizontal scan, said means for generating comprising means responsive to successive scan line sequences to cause said plurality of horizontal deflection increments to be generated in successively smaller time intervals; a clock pulse source; counter means, means for comparing the count in said counter means to a count output of said means for generating which increments at a predetermined different rate for each of said successive scan lines, and means for selectively gating predetermined ones of clock pulses from said clock pulse source to said counter means when said count output of said means for generating exceeds the count in said counter means, whereby a plurality of clock pulses equal that of said number of horizontal deflection increments are serially developed at the output of said means for gating, successive pulses of which exhibit time differential with periodically displaced ones of said horizontal deflection increments not exceeding the time displacement between said periodically displaced ones of said horizontal deflection increments.

9. The system of claim 8 with said means for generating comprising a line counter, means for incrementing said line counter for each of successive ones of said lines to be scanned, a deflection increment defining counter, means for incrementing said deflection increment counter at a rate defined by said clock pulse source, means for multiplying the output count of said deflection increment defining counter by a predetermined different binary number in response to successive incremented count outputs from said line counter, successive ones of said binary numbers being increased from the preceding one by successively greater increments, and the output of said means for multiplying comprising said horizontal increment defining count from said means for generating.

10. In an arc scanned sector cathode ray tube display system, means for generating horizontal and vertical deflection signals respectively defined as $A \sin \omega t$ and $A \cos \omega t$ where A is a predetermined different constant magnitude during each of successive arcs to be scanned and is linearly decreased from a maximum value during the peripheral one of said arcs to successively lesser values for successive arcs beneath said peripheral one, and $\omega$ is a predetermined different magnitude during each of successive arcs to be scanned and is increased from a minimum value during the peripheral one of said arcs to successive greater values for successive arcs beneath said peripheral one, and t is linearly increased from a minimum value at start of each arc scan to a maximum value at end of each arc scan, and means for applying said deflection signals to respective horizontal and vertical beam deflection means of said cathode ray tube whereby the writing speed of said beam in terms of arc deflection increments per unit of time is a like predetermined constant during scanning of each of the successive ones of said arcs.

11. The system of claim 10, with means for storing a like number of display video words corresponding to the number of angular deflection increments of said beam across each of said arcs, means for loading said video words into a shift register means prior to scanning of each successive arc, and means for developing a video clock pulse train of a number of pulses corresponding to said number of display video words, with successive ones of said pulses in said video pulse train having a time coincident relationship with successive ones of a corresponding number of horizontal deflection linearly incremented beam defining positions, means for clocking said shift register means with said video pulse train, and means for controlling the intensity of said beam with the output of said shift register means.

* * * * *